US010917595B2

(12) United States Patent
Li

(10) Patent No.: US 10,917,595 B2
(45) Date of Patent: Feb. 9, 2021

(54) IMAGE SENSOR AND OUTPUT COMPENSATION CIRCUIT OF IMAGE SENSOR

(71) Applicant: SHENZHEN GOODIX TECHNOLOGY CO., LTD., Guangdong (CN)

(72) Inventor: Hsin-Lun Li, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/655,009

(22) Filed: Oct. 16, 2019

(65) Prior Publication Data

US 2020/0045255 A1 Feb. 6, 2020

Related U.S. Application Data

(63) Continuation of application No. PCT/CN2018/077376, filed on Feb. 27, 2018.

(51) Int. Cl.
*H04N 5/363* (2011.01)
*H04N 5/217* (2011.01)
*H04N 5/369* (2011.01)

(52) U.S. Cl.
CPC .......... *H04N 5/363* (2013.01); *H04N 5/2173* (2013.01); *H04N 5/3698* (2013.01)

(58) Field of Classification Search
CPC .... H04N 5/3698; H04N 5/378; H04N 3/1568; H04N 3/155; H04N 5/3745; H01S 5/042; H01S 5/06804
See application file for complete search history.

(56) References Cited

U.S. PATENT DOCUMENTS 8,859,979 B2 * 10/2014 Peizerat ............... H04N 5/3745
250/370.14
9,148,596 B1 9/2015 Sun et al.
(Continued)

FOREIGN PATENT DOCUMENTS

CN 1909378 A 2/2007
CN 101038499 A 9/2007
(Continued)

OTHER PUBLICATIONS

English Abstract Translation of Foreign Reference CN101038499.
(Continued)

*Primary Examiner* — Chiawei Chen
(74) *Attorney, Agent, or Firm* — WPAT, P.C., Intellectual Property Attorneys; Anthony King

(57) ABSTRACT

An output compensation circuit of an image sensor includes a first current mirror circuit, a first current generator circuit and a second current generator circuit. The first current mirror circuit, coupled to a select transistor of a pixel circuit of the image sensor, is configured to, in response to a first current, generate a second current flowing through the select transistor. The select transistor is selectively turned on according to a power supply voltage. When the select transistor is turned on, the pixel circuit outputs the second current through the select transistor. The first current generator circuit outputs a compensation current, serving as a first portion of the first current, to the first current mirror circuit in response to a variation in the power supply voltage. The second current generator circuit outputs a reference current, serving as a second portion of the first current, to the first current mirror circuit.

20 Claims, 5 Drawing Sheets

(56) References Cited

U.S. PATENT DOCUMENTS

| | | | |
|---|---|---|---|
| 9,571,775 B1 | 2/2017 | Zuo et al. | |
| 2005/0099234 A1* | 5/2005 | Perner | G11B 27/22 330/261 |
| 2005/0185078 A1* | 8/2005 | Segura-Puchades | H04N 5/3575 348/308 |
| 2009/0135866 A1* | 5/2009 | Nishimura | H03F 3/08 372/34 |
| 2010/0127741 A1* | 5/2010 | Hatano | H04L 7/0012 327/153 |
| 2011/0279720 A1* | 11/2011 | Nakagawa | H04N 5/3745 348/300 |
| 2015/0208008 A1 | 7/2015 | Gendai | |
| 2015/0288902 A1 | 10/2015 | Sun et al. | |

FOREIGN PATENT DOCUMENTS

| | | | |
|---|---|---|---|
| CN | 101127512 A | 2/2008 | |
| CN | 101339074 A | 1/2009 | |
| CN | 102047541 A | 5/2011 | |
| CN | 105915808 A | 8/2016 | |
| CN | 107017865 A | 8/2017 | |
| CN | 107026991 A | 8/2017 | |
| CN | 107534748 A | 1/2018 | |
| EP | 0895325 A2 * | 2/1999 | ............ H04B 10/58 |
| EP | 3432574 A1 | 1/2019 | |
| WO | 2017159394 A1 | 9/2017 | |
| WO | WO 2017159394 | 9/2017 | |

OTHER PUBLICATIONS

English Abstract Translation of Foreign Reference CN101339074.
English Abstract Translation of Foreign Reference CN107534748.
English Abstract Translation of Foreign Reference CN105915808.
English Abstract Translation of Foreign Reference CN101127512.
English Abstract Translation of Foreign Reference CN107017865.
English Abstract Translation of Foreign Reference CN102047541.
English Abstract Translation of Foreign Reference CN107026991.
English Abstract Translation of Foreign Reference CN1909378.
English Abstract of WO2017159394A1.

* cited by examiner

IMAGE SENSOR AND OUTPUT COMPENSATION CIRCUIT OF IMAGE SENSOR

CROSS-REFERENCE TO RELATED APPLICATIONS

The present application is a continuation of international application No. PCT/CN2018/077376, filed on Feb. 27, 2018, of which is incorporated herein by reference in its entirety.

TECHNICAL FIELD

The present disclosure relates to pixel sensing and, more particularly, to an output compensation circuit for compensating for power supply noise which interferes with an image sensor, and a related image sensor.

BACKGROUND

A pixel array will produce an image with non-uniform light intensity when a power supply voltage provided for pixel circuits, or pixels units, of the pixel array is adversely affected by noise interference. For example, when a row of pixels in a pixel array of a complementary metal-oxide semiconductor (CMOS) image sensor is activated, frequency responses and power transmission paths of pixel circuits within the row of pixels are adversely affected by power supply noise because of process variations, thus degrading power supply rejection ratio (PSRR). Row noise introduced by a row-wise addressing scheme will cause the CMOS image sensor to output an image with non-uniform light intensity.

Therefore, there is a need for a novel image sensor, which is capable of reducing or compensating for effects of process variations to thereby enhance image sensing quality.

SUMMARY

It is an objective of the present disclosure to provide an output compensation circuit of an image sensor and a related image sensor to solve the abovementioned problems.

Some embodiments of the present disclosure comprise an exemplary output compensation circuit for compensating for a sensor output of a pixel circuit. The output compensation circuit comprises a first current mirror circuit, a first current generator circuit and a second current generator circuit. The first current mirror circuit is coupled to a select transistor of the pixel circuit, and is configured to, in response to a first current, generate a second current flowing through the select transistor to compensate for the sensor output. The select transistor is selectively turned on according to a power supply voltage. When the select transistor is turned on, the pixel circuit outputs the second current through the select transistor. The first current generator circuit, coupled to the first current mirror circuit and the power supply voltage, is configured to output a compensation current to the first current mirror circuit in response to a variation in the power supply voltage. The compensation current serves as a first portion of the first current. The second current generator circuit, coupled to the first current mirror circuit, is configured to output a reference current to the first current mirror circuit. The reference current serves as a second portion of the first current.

Some embodiments of the present disclosure comprise an exemplary image sensor. The image sensor comprises a pixel array and an output compensation circuit. The pixel array comprises a plurality of pixel circuits arranged in rows and columns, wherein each pixel circuit is coupled to a power supply voltage, and the pixel circuit comprises an output terminal and a row select transistor. The output terminal is arranged to output a sensor voltage. The row select transistor, coupled to the output terminal, is selectively turned on according to the power supply voltage, wherein when the row select transistor is turned on, the pixel circuit is configured to output the sensor voltage from the output terminal. The output compensation circuit, coupled to the power supply voltage and the output terminal, is configured to compensate for the sensor voltage. The output compensation circuit comprises a first current mirror circuit, a first current generator circuit and a second current generator circuit. The first current mirror circuit is configured to, in response to a first current, generate a second current flowing through the row select transistor, wherein the output terminal is coupled between the row select transistor and the first current mirror circuit. When the row select transistor is turned on, the pixel circuit outputs the second current through the row select transistor to output the sensor voltage from the output terminal. The first current generator circuit, coupled to the first current mirror circuit and the power supply voltage, is configured to output a compensation current to the first current mirror circuit in response to a variation in the power supply voltage. The compensation current serves as a first portion of the first current. The second current generator circuit, coupled to the first current mirror circuit, is configured to output a reference current to the first current mirror circuit. The reference current serves as a second portion of the first current.

DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". Also, the term "couple" and "coupled" are intended to mean either an indirect or direct electrical connection. Accordingly, if a first device is coupled to a second device, that connection may be through a direct electrical connection, or through an indirect electrical connection via other devices and connections.

The proposed image sensor can compensate for effects on PSRR due to a select transistor of a pixel circuit, such as a row select transistor, by converting a power supply voltage of the pixel circuit into a current carrying noise information to thereby simulate/replicate noise which interferes with the power supply voltage. Further description is provided below.

Figure 1:
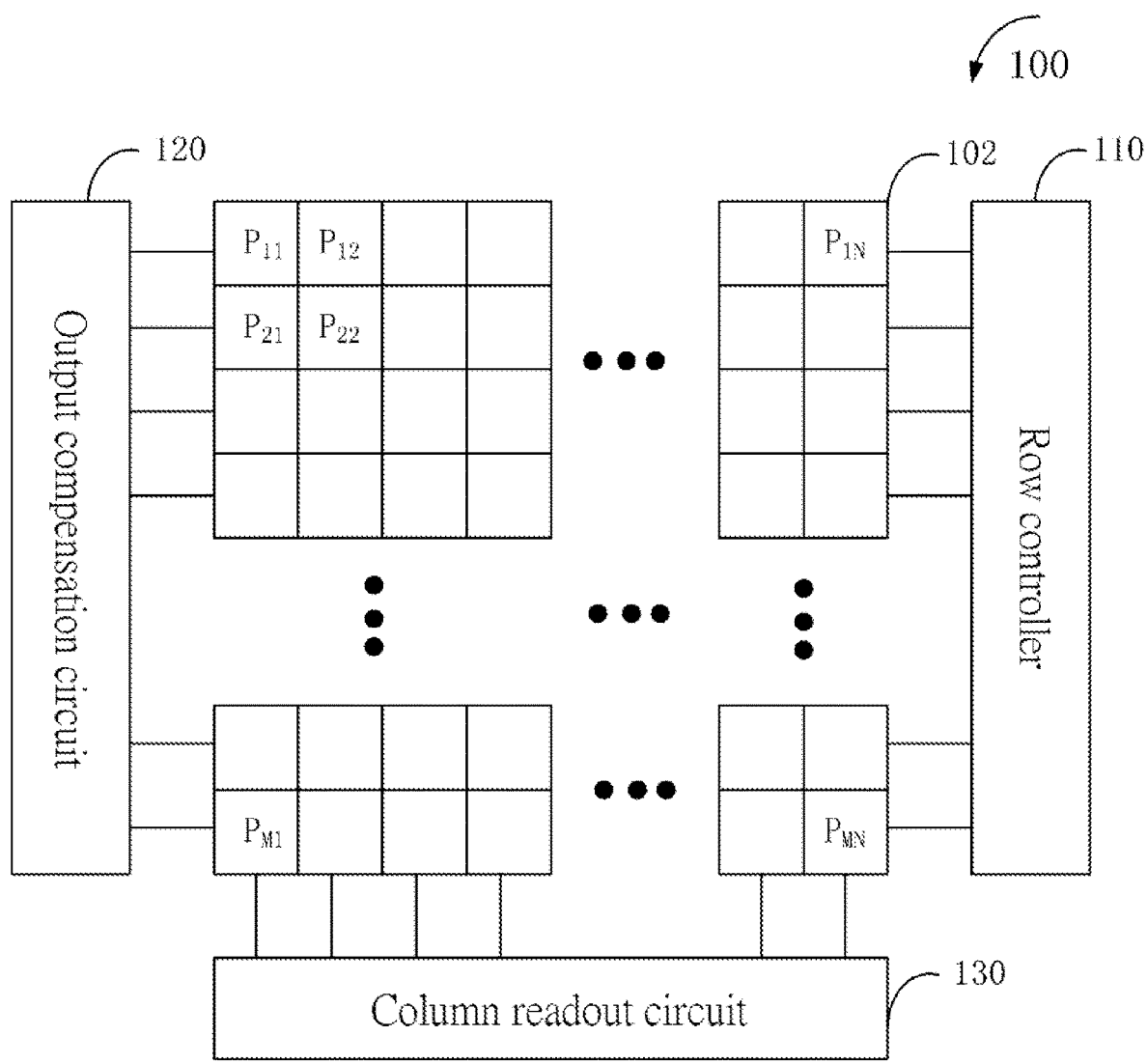
FIG. 1 is a block diagram illustrating an exemplary image sensor according to an embodiment of the present disclosure.

FIG. 1 is a block diagram illustrating an exemplary image sensor according to an embodiment of the present disclosure. The image sensor 100 may include, but is not limited to, a pixel array 102, a row controller 110, an output compensation circuit 120 and a column readout circuit 130. The pixel array 102 includes a plurality of pixel circuits (or pixel units) $P_{11}$-$P_{MN}$ arranged in M rows and N columns, wherein M and N are positive integers greater than one, and each pixel circuit is configured to perform image sensing operation to generate a sensor output, such as a sensor voltage or a sensor current. The row controller 110, coupled to the pixel array 102, is configured to control associated operation of each row of pixels in the pixel array 102. By way of example but not limitation, in some embodiments, the pixel array 102 can be implemented using a pixel array of a CMOS image sensor, wherein each pixel circuit of the pixel array 102 can be implemented using four-transistor (4T) pixel architecture. The 4T pixel architecture includes a transfer transistor, a reset transistor, an amplifier transistor and a row select transistor (not shown in FIG. 1). The row controller 110 can be configured to control charge transfer operation, signal reset operation, signal amplification and row selection of each pixel circuit in each row of pixels.

To compensate for degradation of an image sensing result due to power supply noise, the image sensor 100 may utilize the output compensation circuit 120 to compensate for respective sensor outputs of the pixel circuits $P_{11}$-$P_{MN}$. For example, in some embodiments, the output compensation circuit 120 may convert a power supply voltage of each pixel circuit into a current carrying noise information to simulate/replicate noise which interferes with the power supply voltage, thereby compensating for power supply noise which interferes with a select transistor of each pixel circuit. The column readout circuit 130, coupled to the pixel array 102, can be configured to read out a sensor output of each pixel circuit in the pixel array 102 and perform post-processing upon the sensor output.

In addition, although the output compensation circuit 120 and each of the row controller 110 and the column readout circuit 130 are disposed separately in the image sensor 100 shown in FIG. 1, the output compensation circuit 120 can be integrated into the row controller 110 or the column readout circuit 130 without departing from the scope of the present disclosure.

For illustrative purposes, the proposed compensation scheme for an image sensor is described with reference to some embodiments of output compensation associated with the pixel circuit $P_{11}$ shown in FIG. 1 given below. In some embodiments, output compensation associated with other pixel circuits shown in FIG. 1 is substantially similar/identical to that associated with the pixel circuit $P_{11}$. However, this is not intended to limit the scope of the present disclosure.

Figure 2:
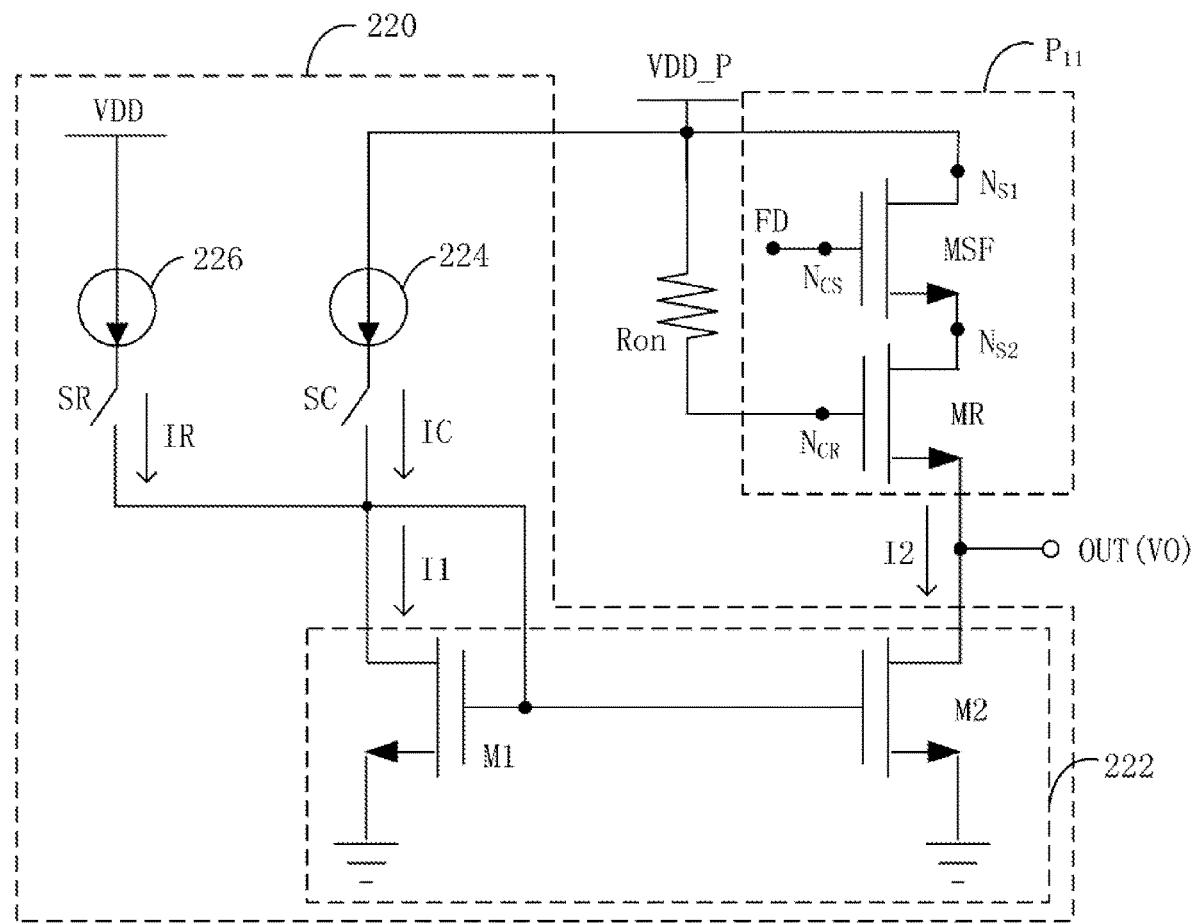
FIG. 2 illustrates an implementation of a circuit used for compensating for an output of the pixel circuit in the output compensation circuit shown in FIG. 1 according to an embodiment of the present disclosure.

FIG. 2 illustrates an implementation of a circuit, used for compensating for an output of the pixel circuit $P_{11}$, in the output compensation circuit 120 shown in FIG. 1 according to an embodiment of the present disclosure. In the present embodiment, the pixel circuit $P_{11}$ is coupled to a power supply voltage VDD_P, and includes an output terminal OUT and a select transistor MR such as a row select transistor. The output terminal OUT is arranged to output a sensor voltage VO, i.e. a sensor output, generated due to image sensing operation performed upon the pixel circuit $P_{11}$. The select transistor MR, coupled to the output terminal OUT, is configured to be selectively turned on according to the power supply voltage VDD_P. For example, the select transistor MR can be controlled by the row controller 110 shown in FIG. 1. When the select transistor MR is turned on, the pixel circuit $P_1$, is configured to output the sensor voltage VO from the output terminal OUT. In the present embodiment, when the select transistor MR is turned on, a control terminal $N_{CR}$ of the select transistor MR can be coupled to the power supply voltage VDD_P through an equivalent resistor Ron.

The pixel circuit $P_{11}$ may further include a transistor MSF such as an amplifying transistor. The transistor MSF is configured to buffer and amplify a voltage at a floating diffusion node FD. For example, the transistor MSF can be implemented using a source follower. A control terminal of the transistor MSF is coupled to the floating diffusion node FD, a connection terminal $N_{S1}$ of the transistor MSF is coupled to the power supply voltage VDD_P, and a connection terminal $N_{S2}$ of the transistor MSF is coupled to the select transistor MR. In some embodiments, the pixel circuit $P_{11}$ can be implemented using 4T pixel architecture, and thus can further include a transfer transistor and a reset transistor (not shown in FIG. 2).

The output compensation circuit 220 can be used to implement at least a portion of the output compensation circuit 120 shown in FIG. 1. The output compensation circuit 220 may include, but is not limited to, a current mirror circuit 222, a current generator circuit 224 and a current generator circuit 226. The current generator circuit 222 is configured to, in response to a first current I1, generate a second current I2 flowing through the select transistor MR to compensate for the sensor voltage VO. The output terminal OUT is coupled between the select transistor MR and the current mirror circuit 222. When the select transistor MR is turned on, the pixel circuit $P_{11}$ can output the second current I2 through the select transistor MR. For example, the current mirror circuit 222 may include a transistor M1 and a transistor M2, wherein the current mirror circuit 222 may generate/control the second current I2 flowing through the transistor M2 according to the first current I1 flowing through the transistor M1.

The current generator circuit 224, coupled to the current mirror circuit 222 and the power supply voltage VDD_P, is configured to output a compensation current IC to the current mirror circuit 222 in response to a variation in the power supply voltage VDD_P, wherein the compensation current IC serves as a first portion of the first current I1. The current generator circuit 226, coupled to the current mirror circuit 222, is configured to output a reference current IR to the current mirror circuit 222, wherein the reference current IR serves as a second portion of the first current I2. For example, the current generator circuit 224 can produce the compensation current IC, which is highly related to the power supply voltage VDD_P, in response to the variation in the power supply voltage VDD_P resulting from noise interference. Additionally, or alternatively, the reference current IR generated by the current generator circuit 226 can be independent of the variation in the power supply voltage VDD_P. As another example, the current generator circuit 226 can be implemented using a bandgap reference current source to thereby provide the reference current IR having a substantially constant current level, wherein the reference current IR may correspond to a direct current (DC) component of the power supply voltage VDD_P. Additionally, or alternatively, the compensation current IC provided by the current generator circuit 224 may correspond to an alternating current (AC) component or a small-signal component of the power supply voltage VDD_P.

As the current mirror circuit 222 can generate/control the second current I2 flowing through the select transistor MR, or the transistor MSF, according to the first current I1 such as a sum of the compensation current IC and the reference current IR, the current generator circuit 224 and the current generator circuit 226 can be regarded as a current source of the select transistor MR (or the transistor MSF). When a variation occurs in the power supply voltage VDD_P because of noise interference, a current generated by the current source, i.e. the first current I1 or the second current I2, varies accordingly to adjust the sensor voltage VO and compensate for PSRR.

It is worth noting that the output compensation circuit 220 may further compensate for other pixel circuit(s) in a row of pixels where the pixel circuit $P_{11}$ is located, such as at least one pixel circuits $P_{12}$-$P_{1N}$ shown in FIG. 1. For example, the current mirror circuit 222 may further include at least one transistor (not shown in FIG. 2), each of which is configured to generate a current flowing through a select transistor of a corresponding pixel circuit. Each of the at least one transistor, disposed in a similar manner to that of the transistor M2, is coupled between an output terminal of a corresponding pixel circuit and a reference voltage such as a ground voltage. As a result, when the row of pixel circuits where the pixel circuit $P_{11}$ is located is activated/selected, the output compensation circuit 220 can be configured to compensate for one or more sensor outputs of one or more pixel circuits in the activated/selected row of pixel circuits.

Additionally, in some embodiments, the output compensation circuit 220 may further include a switch SC and a switch SR. The switch SC is configured to selectively couple the current generator circuit 224 to the current mirror circuit 222. The switch SR is configured to selectively couple the current generator circuit 226 to the current mirror circuit 222. By way of example but not limitation, when output compensation circuit 220 operates in a compensation mode to compensate for the sensor voltage VO, at least one of the switches SC and SR can be switched one. Further, in some embodiments, the current generator circuit 224 can generate the reference current IR according to a power supply voltage VDD, which can be different from the power supply voltage VDD_P coupled to the pixel circuit $P_{11}$. By way of example but not limitation, the power supply voltage VDD_P can have a voltage level greater than that of the power supply voltage VDD so as to provide power needed to drive the pixel circuit $P_{11}$. However, in some embodiments, the power supply voltage VDD_P can be implemented by the power supply voltage VDD directly.

Although the proposed compensation scheme for an image sensor is described with reference to 4T pixel architecture in the above paragraphs, this is not meant to be a limitation of the present disclosure. As long as noise interfering with a power supply voltage can be simulated/replicated to compensate for effects on PSRR due to a select transistor of a pixel circuit, associated modifications and alternatives fall within the scope of the present disclosure. For example, the proposed compensation scheme for an image sensor can be employed in three-transistor (3T) pixel architecture, which includes a reset transistor, a drive transistor and a row select transistor.

Figure 3:
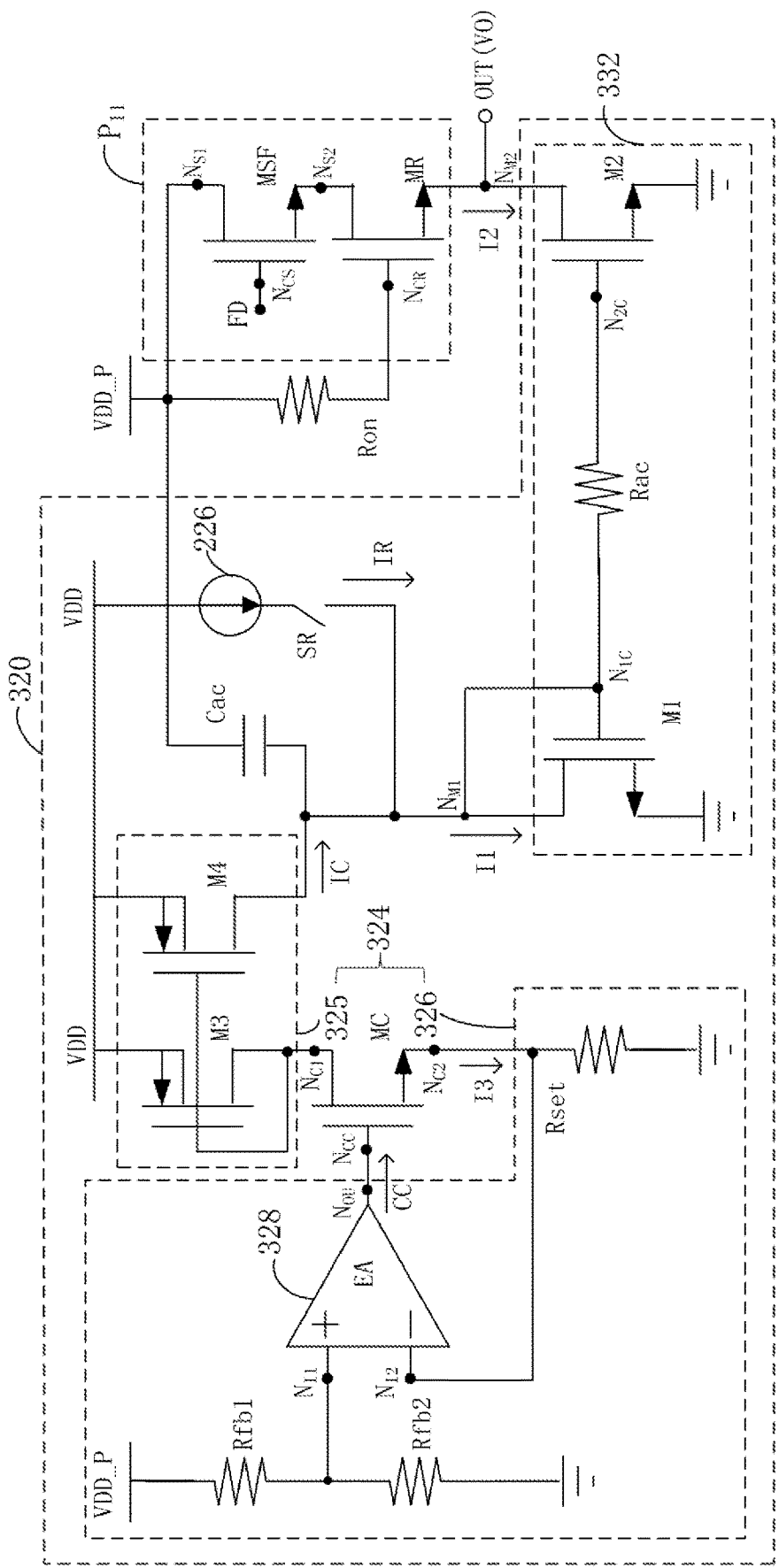
FIG. 3 is a diagram illustrating an implementation of the output compensation circuit shown in FIG. 2 according to an embodiment of the present disclosure.

FIG. 3 is a diagram illustrating an implementation of the output compensation circuit 220 shown in FIG. 2 according to an embodiment of the present disclosure. The output compensation circuit 320 may include a current mirror circuit 322, a current generator circuit 324 and the current generator circuit 226 shown in FIG. 2, wherein the current mirror circuit 222 and the current generator circuit 224 shown in FIG. 2 can be implemented using the current mirror circuit 322 and the current generator circuit 324. The current mirror circuit 322 has a connection terminal $N_{M1}$ and a connection terminal $N_{M2}$. The first current I1 flows through the connection terminal $N_{M1}$, and the second current I2 flows through the connection terminal $N_{M2}$. The current generator circuit 324 may include, but is not limited to, a current mirror circuit 325, a control circuit 326 and a compensation transistor MC. The current mirror circuit 325, coupled to the connection terminal $N_{M1}$ of the current mirror circuit 322, is configured to generate the compensation current IC in response to a third current I3. The control circuit 326, coupled to the power supply voltage VDD_P, is configured to generate a control signal CC in response to a variation in the power supply voltage VDD_P. The compensation transistor MC, coupled to the control circuit 326 and the current mirror circuit 325, is configured to generate the third current I3 according to the control signal CC. In other words, the control circuit 326 can drive the compensation transistor MC according to the variation in the power supply voltage VDD_P, and accordingly produce the third current I3 which is highly related to the power supply voltage VDD_P, thereby simulating/replicating power supply noise which interferes with the select transistor MR. Next, the current mirror circuit 325 can generate the compensation current IC, which is highly related to the power supply voltage VDD_P, according to the third current I3. As a result, the current mirror circuit 322 can generate the second current I2 in response to the first current I1, which includes the compensation current IC highly related to the power supply voltage VDD_P, to adjust the sensor voltage VO and accordingly compensate for PSRR.

In the present embodiment, the current mirror circuit 325 may include a transistor M3 and a transistor M4. The transistor M3 is disposed in a conduction path of the third current I3, and is coupled to a connection node $N_{C1}$ of the compensation transistor MC. The transistor M4 is disposed in a conduction path of the compensation current IC, and is coupled to the connection node $N_{M1}$ of the transistor M1.

The control circuit 326 may include an amplifier 328 and a plurality of resistors Rfb1, Rfb2 and Rset. The amplifier 328 can be implemented using an error amplifier, labeled "EA" in FIG. 3. The amplifier 328 may have an input terminal $N_{I1}$, an input terminal $N_{I2}$ and an output terminal $N_{OU}$. The input terminal $N_{I1}$ is coupled to the resistors Rfb1 and Rfb2. The input terminal $N_{I2}$ is coupled to a connection terminal $N_{C2}$ of the compensation transistor MC. The output terminal $N_{OU}$ is coupled to a control terminal $N_{CC}$ of the compensation transistor MC, and is arranged to output the control signal CC. In addition, the resistor Rfb1 is coupled between the power supply voltage VDD_P and the input terminal $N_{I1}$. The resistor Rfb2 is coupled between the input terminal $N_{I1}$ and a reference voltage, which is implemented using a ground voltage in the present embodiment. The resistor Rset is coupled between the input terminal $N_{I2}$ and the reference voltage.

For example, in some embodiments, when a voltage level of the power supply voltage VDD_P increases because of noise interference, the amplifier 328 can detect a variation in the power supply voltage VDD_P to generate the control signal CC, thereby driving the compensation transistor MC to generate the compensation current IC. It is worth noting that when the compensation current IC increases, the second current I2 increases accordingly, thus decreasing a voltage level at the output terminal OUT. In view of this, in some cases where the voltage level of the power supply voltage VDD_P increases because of noise interference, the output compensation circuit 320 can effectively adjust or compensate for the sensor voltage VO to thereby provide good PSRR.

It is worth noting that the proposed compensation scheme for an image sensor can provide output compensation over a DC range, a medium-high frequency range and a high frequency range. For example, the output compensation circuit 320 may further include a compensation capacitor Cac, which is coupled between the power supply voltage VDD_P and the connection terminal $N_{M1}$. The compensation capacitor Cac can be configured to couple power supply noise at high frequencies into the first current I1, while the current mirror circuit 325, the compensation transistor MC and the control circuit 326 can be configured to couple power supply noise at low frequencies and/or medium-high frequencies into the first current I1. As a result, the current mirror circuit 322 can generate the second current I2 to compensate for power supply noise which interferes with the pixel circuit $P_{11}$ at high frequencies.

Further, in some embodiments, the current mirror circuit 322 may further include a resistor Rac, which is coupled to a control terminal $N_{1C}$ of the transistor M1 and a control terminal $N_{2C}$ of the transistor M2. The resistor Rac and the compensation capacitor Cac can be used to determine/adjust a frequency range over which PSRR compensation is performed. With the use of output compensation performed over low, medium-high and high frequency ranges, the proposed compensation scheme for an image sensor can provide full frequency range PSRR compensation, thus reducing/preventing a phenomenon where an image outputted from a CMOS image sensor exhibits non-uniform light intensity because of row noise.

The above is provided for illustrative purposes only, and is not intended to limit the scope of the present disclosure. In some alternatives, the control circuit 326 may be implemented using other circuit structures. As long as a compensation current high related to a power supply voltage is produced by driving a compensation transistor in response to power supply noise occurring in a pixel circuit, associated modifications and alternatives fall within the scope of the present disclosure.

Figure 4:
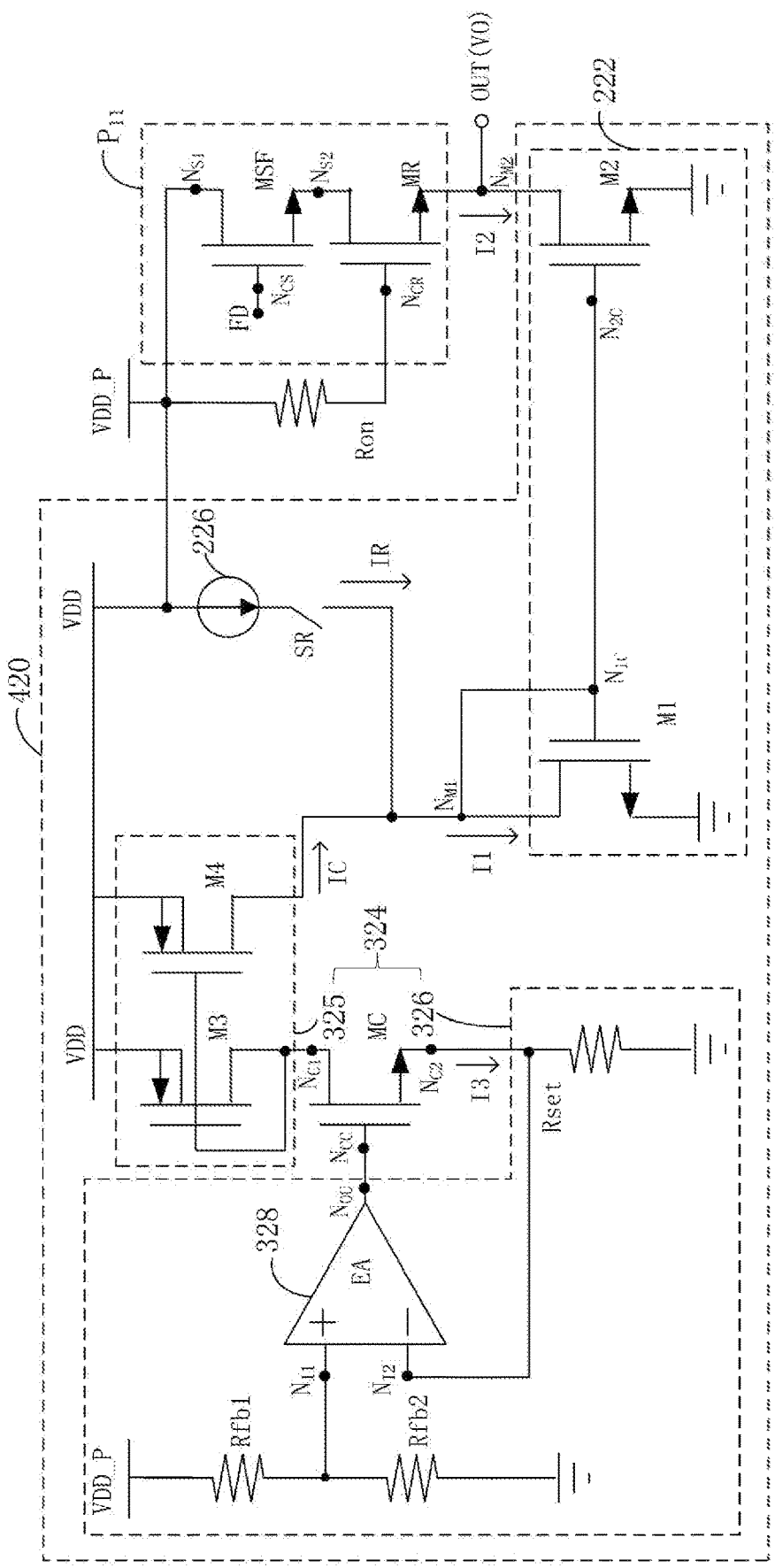
FIG. 4 is a diagram illustrating another implementation of the output compensation circuit shown in FIG. 2 according to an embodiment of the present disclosure.

In some other alternatives, the proposed compensation scheme for an image sensor may be used to provide output compensation over one or more frequency ranges. FIG. 4 is a diagram illustrating another implementation of the output compensation circuit 220 shown in FIG. 2 according to an embodiment of the present disclosure. The circuit structure of the output compensation circuit 420 is similar/identical to that of the output compensation circuit 320 shown in FIG. 3 except that the output compensation circuit 420 does not include the compensation capacitor Cac and the resistor Rac shown in FIG. 3. The output compensation circuit 420 includes the current mirror circuit 222 shown in FIG. 2. In the present embodiment, the output compensation circuit 420 can effectively compensate for effects on the pixel circuit $P_{11}$ due to power supply noise at low frequencies or medium-high frequencies such as frequencies lower than 10 MHz. As those skilled in the art can understand operation of the output compensation circuit 420 shown in FIG. 4 after reading the above paragraphs directed to FIG. 1-3, further description is omitted here for brevity.

Figure 5:
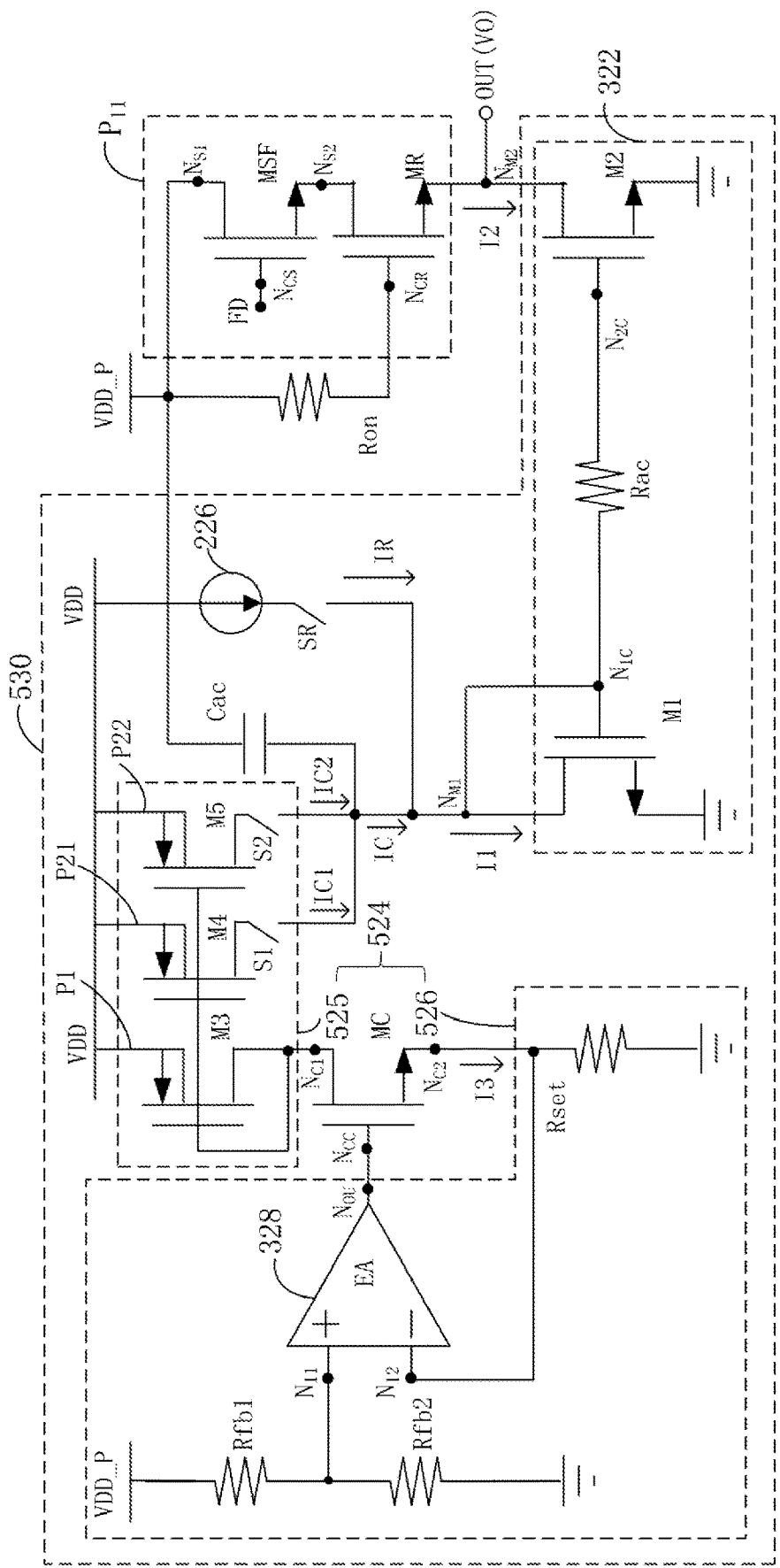
FIG. 5 is a diagram illustrating another implementation of the output compensation circuit shown in FIG. 2 according to an embodiment of the present disclosure.

In still other alternatives, the proposed compensation scheme for an image sensor may adjust the degree of PSRR compensation according to a compensation current. FIG. 5 is a diagram illustrating another implementation of the output compensation circuit 220 shown in FIG. 2 according to an embodiment of the present disclosure. The circuit structure of the output compensation circuit 520 is similar/identical to that of the output compensation circuit 320 shown in FIG. 3 except that the output compensation circuit 520 includes a current mirror circuit 525 capable of selectively adjusting a ratio between the compensation current IC and the third current I3. In the present embodiment, the current mirror circuit 525 may include a first current path P1 and a plurality of second current paths P21 and P22. The first current path P1, coupled to the compensation transistor MC, is arranged to conduct the third current I3. The second current paths P21 and P22, coupled to the current mirror circuit 322, are arranged to conduct the compensation current IC, wherein the second paths P21 and P22 are coupled in parallel with each other, e.g. coupled in parallel between the power supply voltage VDD and the connection terminal $N_{M1}$. Each of the second current paths P21 and P22 is selectively turned on so as to generate at least a portion of the compensation current IC in response to the third current I3. For example, the second current path P21 can be arranged to conduct a current IC1 when turned on, and the second current path P22 can be arranged to conduct a current IC2 when turned on. As a result, the current mirror circuit 525 can adjust a current level of the compensation current IC by turning on at least one of the second current paths P21 and P22. The current mirror circuit 322 can adjust the degree of PSRR compensation accordingly.

In the present embodiment, the transistor M3 is disposed in the first current path P1, the transistor M4 is disposed in the second current path P21, and a transistor M5 is disposed in the second current path P22. Additionally, the second current path P21 further includes a switch S1, which can selectively couple the transistor M4 to the current mirror circuit 322 or the connection terminal $N_{M1}$. The second current path P22 further includes a switch S2, which can selectively couple the transistor M5 to the current mirror circuit 322 or the connection terminal $N_{M2}$. As those skilled in the art can understand operation of the output compensation circuit 520 shown in FIG. 5 after reading the above paragraphs directed to FIG. 1-4, further description is omitted here for brevity.

In view of the above, the proposed image sensor or compensation scheme for an image sensor can effectively compensate for PSRR degradation, caused by power supply noise interfering with a pixel circuit, without increasing a pixel area or designing a high-end power supply, thus reducing/preventing a phenomenon where an image outputted from a CMOS image sensor exhibits non-uniform light intensity because of row noise. In addition, the proposed image sensor or compensation scheme for an image sensor has advantages including a simple circuit structure, low power consumption and a small circuit area.

While certain exemplary embodiments have been described and shown in the accompanying drawing, it is to be understood that such embodiments are merely illustrative of and not restrictive on the present disclosure. Those skilled in the art will readily observe that numerous modifications and alterations of the device and method may be made while retaining the teachings of the present disclosure. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An output compensation circuit for compensating for a sensor output of a pixel circuit, comprising:
    a first current mirror circuit, coupled to a select transistor of the pixel circuit, the first current mirror circuit being configured to, in response to a first current, generate a second current flowing through the select transistor to compensate for the sensor output, wherein the select transistor is selectively turned on according to a power supply voltage; when the select transistor is turned on, the pixel circuit outputs the second current through the select transistor;
    a first current generator circuit, coupled to the first current mirror circuit and the power supply voltage, the first current generator circuit being configured to output a compensation current to the first current mirror circuit in response to a variation in the power supply voltage, the compensation current serving as a first portion of the first current; and
    a second current generator circuit, coupled to the first current mirror circuit, the second current generator circuit being configured to output a reference current to the first current mirror circuit, the reference current serving as a second portion of the first current.

2. The output compensation circuit of claim 1, wherein the reference current is independent of the variation in the power supply voltage.

3. The output compensation circuit of claim 1, wherein the first current generator circuit comprises:
    a second current mirror circuit, coupled to the first current mirror circuit, the second current mirror circuit being configured to generate the compensation current in response to a third current;
    a control circuit, coupled to the power supply voltage, the control circuit being configured to generate a control signal in response to the variation in the power supply voltage; and
    a compensation transistor, coupled to the control circuit and the second current mirror circuit, the compensation transistor being configured to generate the third current according to the control signal.

4. The output compensation circuit of claim 3, wherein the compensation transistor comprises a control terminal, a first connection terminal and a second connection terminal; the first connection terminal is coupled to the second current mirror circuit; the control circuit comprises:
    an amplifier, having a first input terminal, a second input terminal and an output terminal, wherein the second input terminal is coupled to the second connection terminal of the compensation transistor, the output terminal is coupled to the control terminal of the compensation transistor, and the output terminal is arranged to output the control signal;
    a first resistor, coupled between the power supply voltage and the first input terminal;
    a second resistor, coupled between the first input terminal and a reference voltage; and
    a third resistor, coupled between the second input terminal and the reference voltage.

5. The output compensation circuit of claim 3, wherein the second current mirror circuit is further configured to selectively adjust a ratio between the compensation current and the third current.

6. The output compensation circuit of claim 5, wherein the second current mirror circuit comprises:
    a first current path, coupled to the compensation transistor, the first current path being arranged to conduct the third current; and
    a plurality of second current paths, coupled to the first current mirror circuit, the second current paths being arranged to conduct the compensation current, wherein the second paths are coupled in parallel with each other, and each of the second current paths is selectively turned on so as to generate at least a portion of the compensation current in response to the third current.

7. The output compensation circuit of claim 1, wherein the second current generator circuit is a bandgap reference current source.

8. The output compensation circuit of claim 1, wherein the first current mirror circuit has a first connection terminal and a second connection terminal, the first current flows through the first connection terminal, the second current flows through the second connection terminal, and the output compensation circuit further comprises:
    a compensation capacitor, coupled between the power supply voltage and the first connection terminal.

9. The output compensation circuit of claim 8, wherein the first current mirror circuit comprises:
    a first transistor, coupled to the first connection terminal, wherein the first current flows through the first connection terminal and the first transistor;
    a second transistor, coupled to the second connection terminal, wherein the second current flows through the second connection terminal and the second transistor; and
    a resistor, coupled between a control terminal of the first transistor and a control terminal of the second transistor.

10. An image sensor, comprising:
    a pixel array, comprising a plurality of pixel circuits arranged in rows and columns, wherein each pixel circuit is coupled to a power supply voltage, and the pixel circuit comprises:
        an output terminal, arranged to output a sensor voltage; and
        a row select transistor, coupled to the output terminal, the row select transistor being selectively turned on according to the power supply voltage, wherein when the row select transistor is turned on, the pixel circuit is configured to output the sensor voltage from the output terminal; and
    an output compensation circuit, coupled to the power supply voltage and the output terminal, the output compensation circuit being configured to compensate for the sensor voltage, the output compensation circuit comprising:
        a first current mirror circuit configured to, in response to a first current, generate a second current flowing through the row select transistor, wherein the output terminal is coupled between the row select transistor and the first current mirror circuit, and when the row select transistor is turned on, the pixel circuit outputs the second current through the row select transistor to output the sensor voltage from the output terminal;
        a first current generator circuit, coupled to the first current mirror circuit and the power supply voltage, the first current generator circuit being configured to output a compensation current to the first current mirror circuit in response to a variation in the power supply voltage, the compensation current serving as a first portion of the first current; and a second current generator circuit, coupled to the first current mirror circuit, the second current generator circuit being configured to output a reference current to the first current mirror circuit, the reference current serving as a second portion of the first current.

11. The image sensor of claim 10, wherein when the row select transistor is turned on according to the power supply voltage, the power supply voltage is coupled to the row select transistor.

12. The image sensor of claim 10, wherein the pixel circuit further comprises a transistor, a control terminal of the transistor is coupled to a floating diffusion node, a first connection terminal of the transistor is coupled to the power supply voltage, and a second connection terminal of the transistor is coupled to the row select transistor.

13. The image sensor of claim 10, wherein the reference current is independent of the variation in the power supply voltage.

14. The image sensor of claim 10, wherein the first current generator circuit comprises:

a second current mirror circuit, coupled to the first current mirror circuit, the second current mirror circuit being configured to generate the compensation current in response to a third current;

a control circuit, coupled to the power supply voltage, the control circuit being configured to generate a control signal in response to the variation in the power supply voltage; and a compensation transistor, coupled to the control circuit and the second current mirror circuit, the compensation transistor being configured to generate the third current according to the control signal.

15. The image sensor of claim 14, wherein the compensation transistor comprises a control terminal, a first connection terminal and a second connection terminal; the first connection terminal is coupled to the second current mirror circuit; the control circuit comprises:

an amplifier, having a first input terminal, a second input terminal and an output terminal, wherein the second input terminal is coupled to the second connection terminal of the compensation transistor, the output terminal is coupled to the control terminal of the compensation transistor, and the output terminal is arranged to output the control signal;

a first resistor, coupled between the power supply voltage and the first input terminal;

a second resistor, coupled between the first input terminal and a reference voltage; and a third resistor, coupled between the second input terminal and the reference voltage.

16. The image sensor of claim 14, wherein the second current mirror circuit is further configured to selectively adjust a ratio between the compensation current and the third current.

17. The image sensor of claim 16, wherein the second current mirror circuit comprises:

a first current path, coupled to the compensation transistor, the first current path being arranged to conduct the third current; and a plurality of second current paths, coupled to the first current mirror circuit, the second current paths being arranged to conduct the compensation current, wherein the second paths are coupled in parallel with each other, and each of the second current paths is selectively turned on so as to generate at least a portion of the compensation current in response to the third current.

18. The image sensor of claim 10, wherein the second current generator circuit is a bandgap reference current source.

19. The image sensor of claim 10, wherein the first current mirror circuit has a first connection terminal and a second connection terminal, the first current flows through the first connection terminal, the second current flows through the second connection terminal, and the output compensation circuit further comprises:

a compensation capacitor, coupled between the power supply voltage and the first connection terminal.

20. The image sensor of claim 19, wherein the first current mirror circuit comprises:

a first transistor, coupled to the first connection terminal, wherein the first current flows through the first connection terminal and the first transistor;

a second transistor, coupled to the second connection terminal, wherein the second current flows through the second connection terminal and the second transistor; and a resistor, coupled between a control terminal of the first transistor and a control terminal of the second transistor.

* * * * *